May 24, 1960 A. R. BOYLE 2,937,913
ELECTRONIC RECORDING APPARATUS
Filed May 10, 1957 4 Sheets-Sheet 2
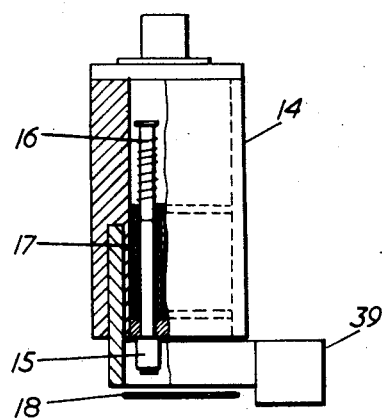
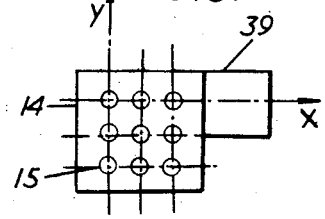
*Inventor*
ARCHIBALD RAYMOND BOYLE

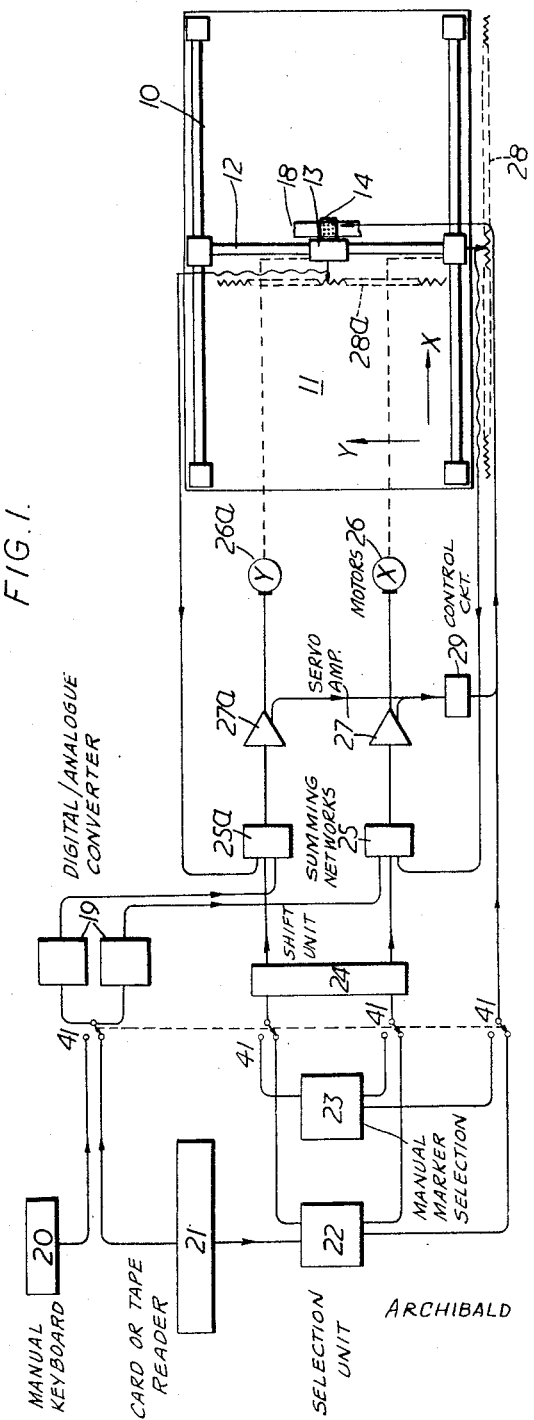

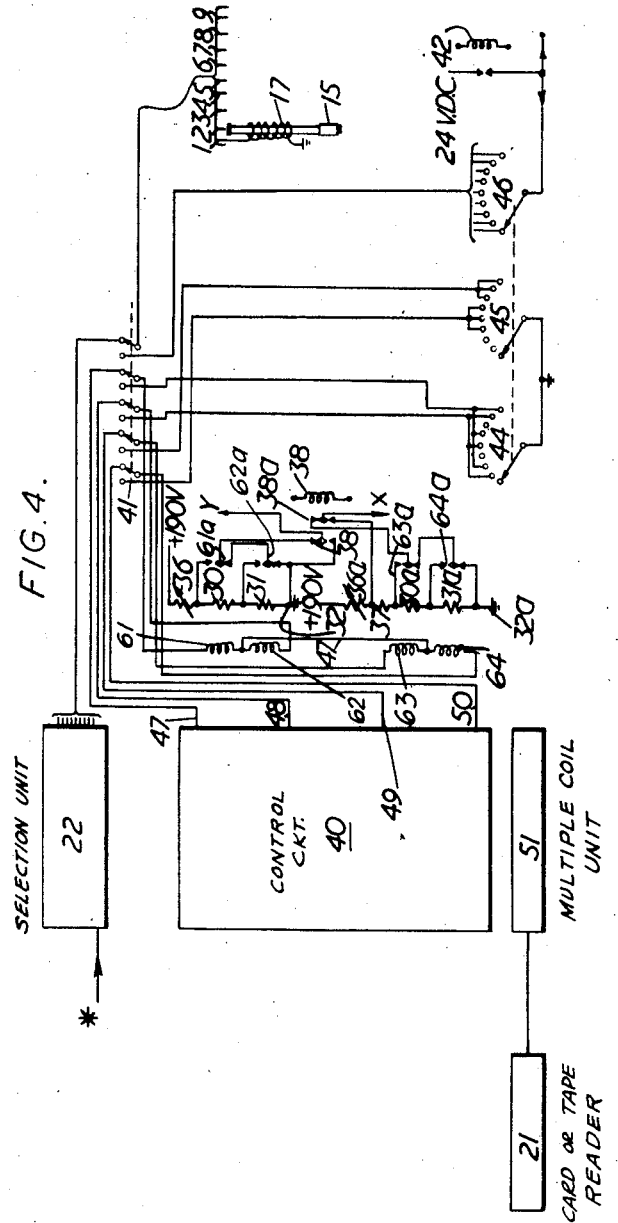

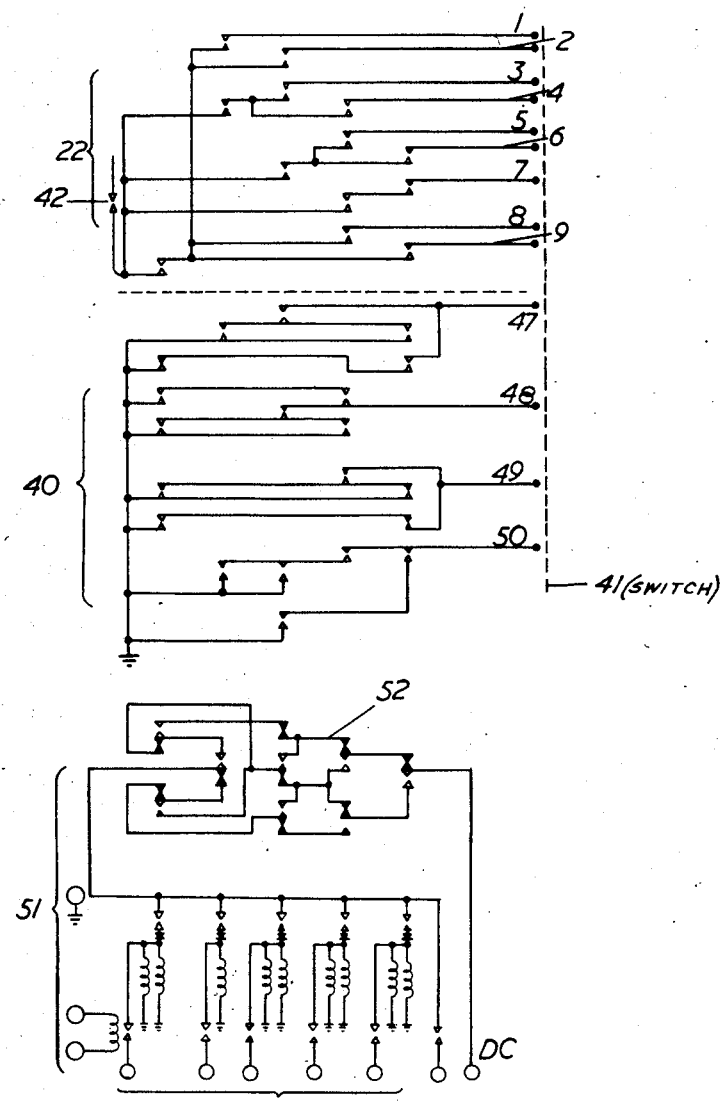

United States Patent Office 2,937,913
Patented May 24, 1960

2,937,913
ELECTRONIC RECORDING APPARATUS

Archibald Raymond Boyle, Glasgow, Scotland, assignor, by mesne assignments, to Dobbie McInnes Electronics Limited, Glasgow, Scotland Filed May 10, 1957, Ser. No. 658,330

Claims priority, application Great Britain May 14, 1956

9 Claims. (Cl. 346—29)

This invention relates to electronic recording apparatus such as a plotting table.

When a plurality or "family" of curves is to be recorded as a series of marks on, say, a plotting table chart, it is very desirable to provide a different mark for each curve. Thus, when curves intersect, no difficulty is encountered in following each curve. Such marks can be dots or small triangles, squares or circles, and in some known arrangements a rotatable wheel carries a peripheral series of type keys each representing one mark. Thus, as the curves are recorded, the marker head of the plotting table moves from point to point on the curves, and the wheel rotates to ensure that the correct mark is printed on the chart. The mark may be printed by bringing the wheel into sharp contact with the chart or with a carbon ribbon or other tracing means interposed between the wheel and the chart. Such a rotary marker entails the disadvantage that marker selection can only be made in sequence, and such rotary movement entails disadvantages such as extra weight in the head, and inaccuracy which increases due to wear. Also if a large number of symbols is provided on a wheel periphery, the wheel diameter becomes so large that when one symbol marks, the adjacent symbols tend to appear.

The present invention is electronic recording apparatus, especially a plotting table, for recording a plurality of graphs, comprising a marker head having a series of selectively actuable markers adapted to mark different symbols, controlling means for locating the co-ordinate positions of the marker head in response to the actual values to be recorded, and means for correcting the controlling means in accordance with the particular marker selected so that the position of the marker head is corrected by an amount corresponding to the co-ordinate location of the selected marker relative to a predetermined datum on the marker head, whereby the position of a mark recorded is not affected by said location of the marker.

The invention is also electronic recording apparatus comprising a plotting table, a gantry for movement relative to a first co-ordinate axis on the table and parallel to a second co-ordinate axis on the table, a marking head carrier for movement along the gantry parallel to said second axis, motors responsive to voltage input one adapted to move the gantry and the other to move the carrier respectively, a plurality of selectively actuable markers in said head adapted to mark different symbols, electronic means for controlling the operating voltage to each motor in response to registered input values, and voltage shift means for modifying said operating voltage to each motor to compensate for the co-ordinate location of the selected marker relative to a predetermined datum on the marker head.

The invention is also in or for electronic recording apparatus, a marker head containing a plurality of selectively actuable markers each marker being actuable relative to said head by electro-magnetic means and being located in a predetermined co-ordinate location on the marker head.

An embodiment of the invention will now be described by way of example with reference to the accompanying drawings in which:

Fig. 1 shows diagrammatically a plotting table and a block diagram of its related electrical circuit.

Fig. 2 shows a fragmentary side view of a marker head.

Fig. 3 shows a plan view of the arrangement of each marker in the marker head.

Fig. 4 shows a circuit for the marker head shift unit, and

Fig. 5 shows the circuits for a relay control unit, an automatic marker selection unit, and a coil unit for operating the relay control circuit.

Referring to the drawings, the plotting table 10 has a fixed chart 11 thereon above which is movable a gantry 12 having a carrier 13 movable along the length thereof. The carrier carries a marker head 14.

The marker head carries a battery of nine markers 15 arranged symmetrically in three rows of three, each row being ¼-inch apart. The markers are of similar construction but each carries a different marking symbol engraved on its lower end such as a dot or cross or a small triangle, square or circle. Each marker is retained by a spring 16 and comprises a plunger which forms the core of a solenoid coil 17. The solenoids are each separately connected to the control system of the plotting table and can be selectively actuated to record on the chart.

A strip of tracing material 18 is stretched between the ends of the gantry to move with the gantry, and lies between the marker head and the chart. The strip is sufficiently broad to ensure that the markers strike the strip to record their symbols on the chart. As the marker head on the carrier moves along the gantry the tracing material tends to wear uniformly. In one case where the head carries nine markers, a strip approximately one inch broad is required.

Referring to Fig. 1, the control circuit for the plotting table comprises briefly, a digital/analogue converter 19 for storing signals registered on a manual key board 20 or from a card or tape reader 21. The converter is basically a Kelvin-Varley type potentiometer in which the values to be plotted along one axis and those to be plotted along another axis are stored separately in the form of voltage levels and are then each fed to separate summing networks. These values will be referred to hereinafter as "X" and "Y" values respectively and similarly will corresponding parts of the apparatus.

Marker selection is made either automatically by a selection unit 22 connected with the tape reader 21, or by a manually operated marker selection unit 23, and the selected marker carrying the symbol may thus be actuated but only after the plotting mechanism is at balance for the particular conditions.

The marker selection unit under operation (22 or 23) passes a signal corresponding to the particular symbol or marker selected to a "shift unit" 24 (to be described later) which produces an X voltage and a Y voltage corresponding to the "position error," i.e., X and Y co-ordinates of the selected marker from a datum point on the marker head. This point will normally coincide with one marker so that its "position-error" will be zero. The X and Y voltages thus formed are then passed onto their respective summing networks 25 and 25a respectively.

The plotting table 10 is of known construction having a motor 26 for driving the gantry along one axis (in this example the X axis) of the chart and the marker head carrier being moved along the gantry by a further motor 26a. "Feed back" potentiometers 28 and 28a are located along the path of movement of each motor 26 and 26a respectively and each is adapted to tap off a voltage corresponding to the respective motor position away from a selected origin on the chart. The X and Y feed-back voltages are then passed to their respective summing networks 25 and 25a.

The three above-mentioned voltages are added arithmetically in the summing networks and the resulting voltage from each is passed to a servo-amplifier 27 or 27a connected to their respective motors. A connection is provided between the amplifiers and the marking head through a control or settle circuit 29 which detects when both the X and Y controls have zero "position-error," that is, when they have reached a state of balance, whereon electrical brakes in the motors are applied, and after a time lag, the marker pulse is transmitted to the marking head to actuate the selected marker.

Referring to Fig. 4, the shift unit 24 comprises basically two similar circuits, one for supplying the X shift, and the other the Y shift. Each circuit is a voltage divider and comprises a pair of similar resistances in series. In the case of the Y shift circuit resistances 30 and 31 are earthed at one end 32 and supplied from a 190 volt source through a variable resistance 36 at the other end. Three tappings are made, one at the high tension end, one between the resistances and one at earth, and solenoid-operated relay contacts 61a and 62a are located between each tapping. The contacts are adapted to connect the circuit to earth when their controlling solenoids are de-energized and thus transmit zero potential to a conductor connected to the summing network. However, when relay solenoid 62 is energised the potential across resistance 31 is transmitted to the summing network and when relay solenoid 61 is energised and 62 is at rest the potential across both resistances 30 and 31 is transmitted to the summing network. The voltage across each resistance will normally be the same and is controllable by the variable resistance 36 and corresponds to the distance of one marker from its neighbour, the markers being symmetrically arranged.

The second circuit similar to the above circuit is located adjacent thereto for supplying the shift along the other axis, in this case the X axis, and comprises series resistances 30a and 31a having tappings to relay contacts 63a and 64a but provided with an additional resistance 37 before the variable resistance 36a and the high tension end.

The two circuits are connected to their respective summing networks through a pair of relay contacts 38b and 38a operated by "set-up" solenoid coil 38 which in its energised condition breaks the connection to each summing network but makes a connection to the X summing network from a tapping above the large resistance 37 and thus injects the voltage existing across the resistances 37, 30a and 31a into the X summing network. This voltage corresponds to a shift of the marker head of 1-inch along the X axis and is provided to permit the marker head to be sighted on the origin of the chart through a transparent sighting block 39 attached to the marker head and whose cross-lines are located 1-inch from the datum point of the marker head.

The solenoid coils 61, 62, 63, 64 operating each shift circuit are operated through relay control circuit 40 which is controlled automatically from the marker selection unit 22 on the tape reader or by the manual marker selection switch 23. Ganged switches 41 are provided to switch either onto automatic or manual selection, or automatic or manual recording.

Referring now to Fig. 5, multiple coil unit 51 operated from the card reader 21 is adapted to operate the contact trees in the control circuit 40 and the automatic marker selection unit 22, each coil and its associated contacts in the above circuits being in the form of a "post office relay."

Only five coils and associated relay trees are utilized since the apparatus operates on a five line code system for translating the punched card signals into the machine code. This means that a particular combination of two coils is operated on selection of a particular marker. The coil operation is sequential, that is a coil will remain energised on selection of the next marker in sequential order.

A "checking" unit 52 is provided between the coils and the unit 40 and comprises a series of contacts each adapted for actuation by an auxiliary coil adjacent to each main coil, the contacts being so connected that energising current to the main coils for operating each full contact tree is not supplied unless two coils have been selected. This insures that two coils are energised at each selection and thus should a card punch mark be incorrect or not properly formed, the checking unit 52 will reject that particular selection and not allow it to be recorded.

The marker selector switch 23 is a 9-position 3-pole switch and comprises three separate rotary switches 44, 45 and 46, each having its contact arm ganged for movement together. Each switch has an arc of 9 contacts to correspond to the number of markers in the marker head.

Two adjacent rotary switches 44 and 45 have their contact arms earthed and their contacts are so connected to the ganged switch 41 that current supplied at point 47 will flow through any selected solenoid coil(s) of the series 61, 62, 63 or 64 to earth and thus operate the relays required to provide the shift voltage for the selected marker.

One switch 46 has its rotary arm connected to a 24 volt D.C. supply through a heavy duty relay 42 operated from the settle circuit 29. This switch has nine lines leading from its nine contacts to the ganged switch (only one line being shown for convenience). Nine lines also emerge from the automatic marker selector 22 on the tape reader and are connected to the opposite arms of the ganged switch, this selector also being supplied with voltage from relay 42. In the above manner a voltage pulse can be transmitted via either circuit to the solenoid 17 of the selected marker.

The converter 19 is provided with controls to alter the scale of plotting of one or both of the axes of plotting to make the final graph of a suitable size.

In operation of the apparatus, assuming for simplicity that the apparatus is switched for manual operation and that one point is being plotted; the X and Y values are recorded on the keyboard and are transmitted to the X and Y parts of the converter 19 then to their respective summing networks 25 and 25a. A feed back voltage from each potentiometer 28 and 28a is also fed into the summing networks. Manual selection switch 23 is rotated to the selected marker thus energising the voltage shift unit to give X and Y shift voltages to the summing networks. Say for example marker No. 6 is selected, therefore since this marker is off-set from the axes of the marker head by ½-inch from the X axis by ¼-inch from the Y axis thus a shift of the gantry of ¼-inch towards the origin of the table is required, and a shift of the marker head of ½-inch away from the X axis of the table is required. To provide this shift the relay control circuit is operated by the manual marker selector switch 23. The sum of the voltages in each network is then fed to the amplifiers and thence to the motors which then move until their feed back voltages balance with their inputs. When the system has come to rest the control circuit 29 allows a pulse from the marker actuator switch 46 to actuate the selected marker.

In one typical application the equipment is used to record the stress on various parts of a model aircraft in a wind tunnel, as the wind speed varies. Information is obtained from strain gauges on the model and is converted into punched paper strip form. The air speeds will represent the X-axis values on the chart and each speed given by a series of holes punched in the strip. The corresponding strain from one of the gauges, i.e.

the Y-axis value on the chart, is represented by a second series of holes. The particular strain gauge is denoted by a further punched hole. The X-axis and Y-axis values are converted as mentioned herein into voltage pulses for the motors driving the gantry and carriage, in known manner. The punched hole representing the strain gauge has a double effect. Firstly, a voltage addition is given to the main control system to modify the movement of the gantry, or the carrier, or both. Secondly, the appropriate marker is actuated when the marker head reaches its required position. This modification or correction of the movement of the head ensures that a mark will be recorded on the chart in a position which is not affected by the position on the head of the marker making the mark.

The invention thus provides an arrangement in which no mechanical movement occurs in the marking head due to changeover from one marker to another. This gives the advantage of a high degree of positional accuracy since the position correction is made by the motor control circuit and not by an auxiliary mechanism attached to the marker head. Any marker can thus be selected in random order.

The apparatus may be used also for analogue recording and for this purpose a time switch or interrupter circuit is provided to allow the selected marker to be operated continuously so as to produce a continuous line of marks. The markers may also be actuated automatically and continuously in any selected sequence, so that say, for a steadily progressing movement along the X-axis, the Y values of each symbol are continuously plotted seqentially or in any order.

It will be understood that the invention can be applied to recording of marks other than those for plotting graphs and the apparatus may vary in some respects, for instance other means beside punched cards or tape may be used to control the apparatus and the markers may be adapted to punch the chart instead of only marking it, and more than nine markers and their related circuits may be provided.

I claim:

1. Electronic recording apparatus such as a plotting table for recording a plurality of graphs, comprising a marker head having a series of selectively actuable markers adapted to mark different symbols, controlling means for locating the co-ordinate positions of the marker head in response to the actual values to be recorded, co-ordinate position shift means responsive to said selecting means for correcting the controlling means in accordance with the particular marker to be actuated so that the position of the marker head is corrected by an amount corresponding to the co-ordinate location of the selected marker relative to a predetermined datum on the marker head, and summating means for summating the co-ordinate position determined by said controlling means and by said co-ordinate position shift means, whereby the position of a mark recorded is not affected by said location of the marker.

2. Electronic recording apparatus comprising a plotting table, a gantry for movement relative to a first co-ordinate axis on the table and parallel to a second co-ordinate axis on the table, a marking head carrier for movement along the gantry parallel to said second axis, a pair of voltage responsive motors adapted to move the gantry and the carrier respectively, a plurality of selectively actuable markers in said head adapted to mark different symbols, electronic means for controlling the voltage to each motor in response to registered input values, means for selecting a particular marker, a voltage shift means responsive to said selecting means for supplying a voltage responsive to marker location, to compensate for the co-ordinate location of the selected marker relative to a predetermined datum on the marker head, and summating means for summating said voltage responsive to registered input values and said voltage responsive to marker location into a motor operating voltage.

3. Apparatus as claimed in claim 2 including coil means associated with each of said markers for actuating the marker, said markers being slidably mounted in predetermined locations in the marker head.

4. Apparatus as claimed in claim 2 in which said voltage shift means comprises voltage dividing means, and relay means having a plurality of solenoids, each actuable by a particular marker selecting means, and contacts in circuit with different portions of said voltage dividing means, thereby adapted to supply said voltages responsive to marker location.

5. Apparatus as claimed in claim 4 in which said voltage shift means further comprises a pair of resistances in series supplied with adjustable voltage at one end, earthed at the other end, connected to fixed contacts on said relay means at both ends and between the resistances, said relay contacts being separately actuable and electrically interconnected, one for tapping the voltage across one resistance, and the other for tapping the voltage across both resistances, and conductor means for transmitting said voltages to the voltage responsive motors.

6. Apparatus as claimed in claim 5 including manual relay control means adapted to operate a particular coil in response to the particular marker selected.

7. Apparatus as claimed in claim 5 including automatic relay control means adapted to operate a particular coil in response to the particular marker selected.

8. Electronic recording apparatus comprising a plotting table, a gantry for movement along one axis on the table, a marking head carrier for movement along the gantry parallel to another axis, motors adapted to move the gantry and the marking head carrier respectively, a plurality of selectively actuable markers in said head, a keyboard for registering values to be recorded, a tape reader for automatically registering values to be recorded from a tape or card, a digital to analogue converter for storing in one part thereof values to be plotted along one axis and in another part thereof values to be plotted along another axis, switching means for alternately connecting said converter to either said keyboard or said tape reader a summing resistance network connected to each of said converter parts, a manual marker selection device and an automatic marker selection device the latter being actuable by the tape reader and each interchangeably connected to a voltage shift unit connected to the summing networks, said voltage shift unit including voltage dividing means being adapted to supply to each network a correcting voltage corresponding to the location of the selected marker on the marker head, a potentiometer extending along the path of movement of each motor and each connected to the corresponding summing network to provide a feed-back voltage corresponding to each co-ordinate position of the marker head, a servo amplifier connected between the output side of each summing network to the corresponding motor for amplifying the resultant voltage from said network, a connection between each amplifier to the marker head to free the markers for actuation when the gantry and marker head have each reached their selected positions, and an interchangeable connection between said manual marker selection device and the automatic marker selection device to the marker head for actuating the selected marker.

9. For electronic recording apparatus, a marker head comprising a plurality of selectively actuable markers, each marker being movably located in a predetermined co-ordinate position in said head, voltage responsive motor means adapted to move the marker head, means for selecting a particular marker, electro-magnetic means adapted for actuating a selected marker relative to said head, each said electro-magnetic means being operable in response to said selecting means, in combination with voltage controlling means responsive to registered input values, for locating the co-ordinate position of the marker head in response to the actual values to be recorded, voltage shift means responsive to said selecting means for supplying a voltage responsive to marker location to compensate for the co-ordinate location of the selected marker relative to a predetermined datum on the marker head, and summating means for summating said voltage responsive to registered input values and said voltage responsive to marker location into a motor operating voltage.

References Cited in the file of this patent

UNITED STATES PATENTS

| | | |
|---|---|---|
| 2,651,400 | Young et al. | Sept. 8, 1953 |
| 2,779,655 | Kliever | Jan. 29, 1957 |
| 2,795,476 | Gould | June 11, 1957 |